United States Patent
Ryu et al.

(10) Patent No.: US 7,629,402 B2
(45) Date of Patent: Dec. 8, 2009

(54) ACRYLONITRILE-BUTADIENE-STYRENE RESIN COMPOSITION HAVING GOOD WEATHERABILITY AND THERMOSTABILITY

(75) Inventors: Si-kyung Ryu, Bucheon-si (KR); Yong-yeon Hwang, Daejeon (KR); Jin-woo Yi, Yeosu-si (KR); Young-young Hwang, Yeosu-si (KR); Je-sun Yoo, Pohang-si (KR)

(73) Assignee: LG Chem, Ltd. (KR)

( * ) Notice: Subject to any disclaimer, the term of this patent is extended or adjusted under 35 U.S.C. 154(b) by 272 days.

(21) Appl. No.: 11/561,169

(22) Filed: Nov. 17, 2006

(65) Prior Publication Data

US 2007/0142524 A1 Jun. 21, 2007

(30) Foreign Application Priority Data

Dec. 19, 2005 (KR) ...................... 10-2005-0125543

(51) Int. Cl.
*C08K 5/04* (2006.01)
*C09B 67/00* (2006.01)
(52) U.S. Cl. ...................................... 524/394; 524/502
(58) Field of Classification Search ................. 524/394
See application file for complete search history.

(56) References Cited

FOREIGN PATENT DOCUMENTS

| KR | 1020030056039 | * | 7/2003 |
|---|---|---|---|
| KR | 1020050043404 | | 5/2005 |
| WO | 9721763 | | 6/1997 |
| WO | 9828361 | | 7/1998 |

OTHER PUBLICATIONS

Translation of KR 1020030056039, Jul. 2003.*

* cited by examiner

*Primary Examiner*—Ling-Siu Choi
*Assistant Examiner*—Hui Chin
(74) *Attorney, Agent, or Firm*—Cantor Colburn, LLP

(57) ABSTRACT

The present invention relates to an acrylonitrile-butadiene-styrene resin composition, and more precisely, an acrylonitrile-butadiene-styrene resin composition which is prepared by adding a brominated organic compound flame retardant, an antimony flame retardant auxiliary and one or more other compounds selected from a group consisting of metal stearate and stearamide compounds to a basic resin composed of acrylonitrile-butadiene-styrene copolymer and styrene-acrylonitrile copolymer.

The acrylonitrile-butadiene-styrene resin composition of the present invention not only has excellent flame resistance but also has improved thermostability and weatherability.

8 Claims, No Drawings

ACRYLONITRILE-BUTADIENE-STYRENE RESIN COMPOSITION HAVING GOOD WEATHERABILITY AND THERMOSTABILITY

This application claims the benefit of the filing date of Korean Patent Application No. 10-2005-0125543 filed on Dec. 19, 2005 in the Korean Intellectual Property Office, the disclosure of which is incorporated herein in its entirety by reference.

TECHNICAL FIELD

The present invention relates to an acrylonitrile-butadiene-styrene resin composition, and more precisely, an acrylonitrile-butadiene-styrene resin composition with excellent flame resistance and improved weatherability and thermostability.

BACKGROUND ART

Owing to its excellent mechanical properties and workability, acrylonitrile-butadiene-styrene (referred to as 'ABS' hereinafter) has been widely applied to electric appliances, electronic products and office automation devices. However, the resin itself does not have flame resistance. To endow flame resistance to the ABS resin, a flame retardant and a flame retardant auxiliary have been added.

ABS resin has another disadvantage of poor weatherability, which is attributed to the unsaturated binding region of butadiene rubber, one of the major components of the resin, being easily cut off by UV, oxygen and heat, and causes aging of the resin.

The addition of a flame retardant and a flame retardant auxiliary to the resin to endow flame resistance has the problems of reducing the mechanical properties, impact resistance, thermostability and weatherability.

As explained hereinbefore, a flame retardant additive to ABS resin reduces not only its mechanical properties but also thermostability and weatherability. To avoid such problems, different kinds of stabilizers might be used to improve thermostability and weatherability. However, the addition of a high-priced stabilizer results in an increase of production costs and might reduce thermostability.

Thus, development of an acrylonitrile-butadiene-styrene resin having excellent thermostability, weatherability and flame resistance is needed.

DISCLOSURE OF THE INVENTION

To overcome the above problems of the conventional ABS resin, it is an object of the present invention to provide an acrylonitrile-butadiene-styrene resin composition with excellent flame resistance and improved weatherability and thermostability.

The above and other objects of the present invention can be achieved by the following embodiments of the present invention. To achieve the object of the present invention, the present invention provides an acrylonitrile-butadiene-styrene resin composition comprising:

a) 100 weight part of a basic resin composed of an acrylonitrile-butadiene-styrene copolymer and a styrene-acrylonitrile copolymer;

b) 10~30 weight part of a brominated organic compound as a flame retardant;

c) 1~20 weight part of an antimony flame retardant auxiliary; and d) 1~10 weight part of one or more compounds selected from a group consisting of metal stearate and stearamide compounds.

The present invention is described in detail hereinafter.

The present inventors completed this invention by developing an ABS resin composition having excellent weatherability and thermostability, which the conventional ABS resin does not have, by using a brominated organic compound flame retardant.

The basic resin of a) is preferably composed of:

① 10~90 weight part of an acrylonitrile-butadiene-styrene copolymer resin; and

② 10~90 weight part of a styrene-acrylonitrile copolymer resin.

The acrylonitrile-butadiene-styrene copolymer resin of ① is prepared by polymerization and preferably includes rubber by 30~70 weight %.

To prepare the acrylonitrile-butadiene-styrene copolymer resin of ①, the acrylonitrile-butadiene-styrene copolymer resin latex is first prepared by emulsion polymerization, whereby to the monomer are added 30~70 weight part of butadiene rubber latex with a mean diameter of 0.1~0.5 μm, 0.6~2 weight part of an emulsifying agent, 0.2~1 weight part of a molecular weight regulator, 0.05~0.5 weight part of a polymerization initiator, 5~40 weight part of an acrylonitrile monomer and 20~70 weight part of a styrene monomer at one time or continuously, followed by emulsion polymerization. The prepared acrylonitrile-butadiene-styrene copolymer resin latex is coagulated with 5% sulfuric acid solution to give acrylonitrile-butadiene-styrene copolymer resin powders.

The styrene-acrylonitrile copolymer resin of ② composing the basic resin of a) has a weight average molecular weight of 50,000~150,000 and the preferable content of acrylonitrile monomer therein is 20~40 weight part. This resin can be used alone or in a mixture of two or more resins.

The brominated organic compound flame retardant of b) is selected from a group consisting of tetra bromo bisphenol A, brominated epoxy oligomer, hexabromo diphenoxy ethane and pentabromophenyl ethane, particularly deca bromo diphenyl ethane compound represented by the following formula 1 is preferably used.

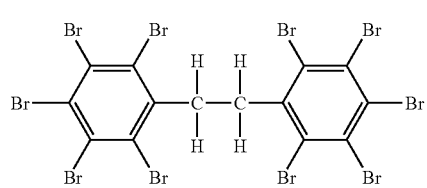

[Formula 1]

The preferable content of the brominated organic compound flame retardant of b) is 10~30 weight part for 100 weight part of the basic resin. When the content of the flame retardant is within the above range, flame resistance, workability and mechanical strength are improved.

The antimony flame retardant auxiliary of c) plays a role in increasing flame resistance together with the brominated organic compound, which is exemplified by antimony trioxide, antimony pentoxide, metal antimony, antimony trichloride, etc. Particularly, antimony trioxide is preferred.

The preferably used antimony trioxide has a mean diameter of 0.02~5 μm. It is preferable for the mean diameter to be up to 0.5 μm to produce high impact resistance.

The preferable content of the antimony flame retardant auxiliary of c) is 1~20 weight part for 100 weight part of the basic resin.

The metal stearate or stearamide compound of d) is a lubricant, which improves fluidity and the physical properties of a product.

The metal stearate compound is one or more compounds selected from a group consisting of calcium stearate, magnesium stearate, sodium stearate, zinc stearate, barium stearate and aluminum stearate, and the stearamide compound can be ethylene bis stearamide.

The preferable content of the metal stearate and stearamide compound of d) is 1~10 weight part for 100 weight part of the basic resin.

According to the present invention, an acrylonitrile-butadiene-styrene resin composition which has excellent thermostability and weatherability as well as excellent physical properties can be prepared by adding a brominated organic compound flame retardant to the basic resin comprising acrylonitrile-butadiene-styrene copolymer resin and styrene-acrylonitrile copolymer resin produced by emulsion graft-polymerization, adding an antimony flame retardant auxiliary to improve thermostability and weatherability, and by adding the metal stearate and stearamide compound to improve the physical properties.

The acrylonitrile-butadiene-styrene resin composition can additionally include 1~15 weight part of chlorinated polyethylene as an impact resistance modifier for 100 weight part of the basic resin.

The acrylonitrile-butadiene-styrene resin composition can also include additives such as lubricants, heat stabilizers, anti-dripping agents, antioxidants, photo stabilizers, UV intercepting agents, pigments or inorganic fillers.

As an additive, a fluorine compound can be added by 0.5~2 weight part for 100 weight part of the basic resin as an anti-dripping agent and the preferable contents of a lubricant and a stabilizer are 0.2~10 weight part each.

BEST MODE FOR CARRYING OUT THE INVENTION

Practical and presently preferred embodiments of the present invention are illustrated as shown in the following examples.

However, it will be appreciated that those skilled in the art, on consideration of this disclosure, may make modifications and improvements within the spirit and scope of the present invention.

EXAMPLES

Example 1

To 100 weight part of the basic resin prepared by emulsion graft-polymerization and composed of 39 weight part of ABS copolymer resin, in which the mean diameter of butadiene rubber is about 0.3 μm, 48 weight part of styrene-acrylonitrile copolymer resin (A), which has a weight average molecular weight of 120,000 and contains 25 weight part of acrylonitrile, and 13 weight part of styrene-acrylonitrile copolymer resin (B), which has a weight average molecular weight of 110,000 and contains 23 weight part of acrylonitrile were added 15 weight part of the decabromodiphenylethane compound, a brominated organic compound flame retardant (Product name: Saytex 8010); 1 weight part of ethylene bis stearamide (EBA), a stearamide lubricant; 6 weight part of antimony trioxide which had a mean diameter of 0.35 μm;, 7 weight part of chlorinated polyethylene; 0.5 weight part of dimethylpolysiloxane; 0.1 weight part of a dropping inhibitor; and 0.5 weight part of an antioxidant.

The mixture was mixed evenly in a Henschel mixer, followed by extrusion using a twin screw extruder to give a resin composition in the form of a pellet. The prepared pellet was injection molded, resulting in a sample to test the physical properties and flame resistance. The evaluation of each physical property is shown in Table 1.

Example 2

An experiment was performed in the same manner as described in Example 1 except that 14 weight part of a brominated organic compound flame retardant (Saytex 8010), 7 weight part of a stearamide lubricant (EBA), and 7 weight part of antimony trioxide with a mean diameter of 0.35 μm were added to 100 weight part of the basic resin composed of 35 weight part of ABS copolymer resin and 65 weight part of styrene-acrylonitrile copolymer resin (B), which has a weight average molecular weight of 110,000 and contains 23 weight part of acrylonitrile according to the composition listed in Table 1.

Example 3

An experiment was performed in the same manner as described in Example 1 except that 14 weight part of a brominated organic compound flame retardant (Saytex 8010), 5 weight part of a stearamide lubricant (EBA), and 7 weight part of antimony trioxide with a mean diameter of 0.35 μm were added to 100 weight part of the basic resin composed of 39 weight part of ABS copolymer resin and 61 weight part of styrene-acrylonitrile copolymer resin (B), which has a weight average molecular weight of 110,000 and contains 23 weight part of acrylonitrile according to the composition listed in Table 1.

Example 4

An experiment was performed in the same manner as described in Example 2 except that 11 weight part of the brominated organic compound flame retardant was used.

Example 5

An experiment was performed in the same manner as described in Example 2 except that 25 weight part of the brominated organic compound flame retardant was used.

Comparative Example 1

An experiment was performed in the same manner as described in Example 1 except that 15 weight part of triphenylphosphate (TPP), a phosphoric organic compound flame retardant, was used.

Comparative Example 2

An experiment was performed in the same manner as described in Example 1 except that the antimony flame retardant auxiliary was not used.

Comparative Example 3

An experiment was performed in the same manner as described in Example 1 except that ethylene bis stearamide (EBA), a stearamide compound, was not used.

TABLE 1

|  | Example | | | | | Comparative Example | | |
|---|---|---|---|---|---|---|---|---|
|  | 1 | 2 | 3 | 4 | 5 | 1 | 2 | 3 |
| ABS resin | 39 | 35 | 39 | 35 | 35 | 39 | 39 | 39 |
| SAN resin (A) | 48 | — | — | — | — | 48 | 48 | 48 |
| SAN resin (B) | 13 | 65 | 61 | 65 | 65 | 13 | 13 | 13 |
| Brominated organic compound flame retardant | 15 | 14 | 14 | 11 | 25 | — | 15 | 15 |
| Phosphoric organic compound flame retardant | — | — | — | — | — | 15 | — | — |
| Antimony flame retardant auxiliary | 6 | 7 | 7 | 7 | 7 | 6 | — | 6 |
| Ethylene bis stearamide | 1 | 7 | 5 | 7 | 7 | 1 | 1 | — |

The acrylonitrile-butadiene-styrene resin compositions prepared in the above examples and comparative examples were tested for their physical properties as follows and the results are shown in Table 2.

(1) Impact strength: measured against ⅛ inch thickness by ASTM D256 and the unit is Kg·cm/cm.

(2) Tensile strength: measured at 50 mm/min by ASTM D638 and the unit is Kg/cm².

(3) Elongation: measured at 50 mm/min by ASTM D638 and the unit is %

(4) Fluidity: measured under the conditions of 220° C. and 10 kg by ASTM D1238 and the unit is g/10 min.

(5) Thermostability: during the injection molding, the processing temperature was set at 250° C. and the resins stayed for 15 minutes in the injector, followed by comparing the results with those that did not stay, and presented by ΔE.

(6) Weatherability: ΔE is measured after leaving the plate sample for 5 hours in a UV sterilizer.

(7) Flame resistance: measured according to the UL-94 standard.

TABLE 2

| Physical property | Example | | | | | Comparative Example | | |
|---|---|---|---|---|---|---|---|---|
|  | 1 | 2 | 3 | 4 | 5 | 1 | 2 | 3 |
| Impact strength (Kg · cm/cm) | 18.3 | 20.3 | 22.3 | 23.5 | 17.1 | 30 | 30.5 | 14.3 |
| Tensile strength (Kg/cm²) | 350 | 333 | 329 | 342 | 312 | 350 | 334 | 370 |
| Elongation (%) | 22.7 | 29.6 | 28.6 | 27.7 | 24.2 | 22.6 | 34.7 | 17.5 |
| Fluidity (g/10 min) | 37.0 | 41.0 | 38.8 | 35.0 | 47.0 | 50.4 | 35 | 28 |
| Thermostability (ΔE) | 6.54 | 7.95 | 9.09 | 6.80 | 8.30 | 6.85 | 7.25 | 7.1 |
| Weatherability (5 Hrs; ΔE) | 2.05 | 2.15 | 2.13 | 2.10 | 2.01 | 2.8 | 2.64 | 2.5 |
| Flame resistance (1/12") | V-0 | V-0 | V-0 | V-0 | V-0 | Burning | Burning | V-0 |

As shown in Table 2, the acrylonitrile-butadiene-styrene resin compositions of Examples 1~5 were confirmed to have excellent thermostability, weatherability and flame resistance, compared with the acrylonitrile-butadiene-styrene resin compositions of Comparative Examples 1~3.

In particular, the resin with the addition of Saytex 8010, a brominated organic compound flame retardant, exhibited excellent flame resistance and at the same time had good weatherability and thermostability. In addition, impact strength and fluidity of the resin increased with an increase in the content of ethylene bis stearamide (EBA), a stearamide lubricant, and accordingly the workability of the product was improved.

INDUSTRIAL APPLICABILITY

As explained hereinbefore, the present invention provides an acrylonitrile-butadiene-styrene resin composition with excellent flame resistance and improved weatherability and thermostability.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. An acrylonitrile-butadiene-styrene resin composition which consists essentially of:
   a) 100 weight part of a basic resin composed of an acrylonitrile-butadiene-styrene copolymer and a styrene-acrylonitrile copolymer;
   b) 10~30 weight part of a brominated organic compound as a flame retardant;
   c) 1~20 weight part of an antimony flame retardant auxiliary; and
   d) 1~10 weight part of stearamide compounds.

2. The acrylonitrile-butadiene-styrene resin composition according to claim 1, wherein the basic resin of a) is composed of:
   ① 10~90 weight part of an acrylonitrile-butadiene-styrene copolymer resin containing rubber at the level of 30~70 weight % and prepared by emulsion graft-polymerization; and
   ② 10~90 weight part of one or more styrene-acrylonitrile copolymer resins having a weight average molecular weight of 50,000~150,000 and containing acrylonitrile monomer at the level of 20~40 weight part.

3. The acrylonitrile-butadiene-styrene resin composition according to claim 1, wherein the brominated organic compound flame retardant of b) is one or more compounds selected from a group consisting of tetra bromo bisphenol A, brominated epoxy oligomer, hexabromo diphenoxy ethane and pentabromophenyl ethane.

4. The acrylonitrile-butadiene-styrene resin composition according to claim 1, wherein the brominated organic compound flame retardant of b) is the compound representative by the following formula 1.

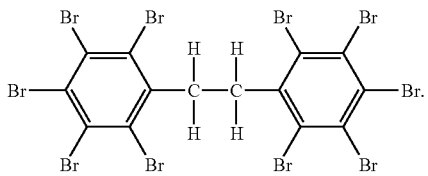

[Formula 1]

5. The acrylonitrile-butadiene-styrene resin composition according to claim 1, wherein the antimony flame retardant auxiliary of c) is one or more compounds selected from a group consisting of antimony trioxide, antimony pentoxide, metal antimony and antimony trichloride.

6. The acrylonitrile-butadiene-styrene resin composition according to claim 1, wherein the stearamide compound of d) is ethylene bis stearamide.

7. The acrylonitrile-butadiene-styrene resin composition according to claim 1, wherein the resin composition additionally includes 1~15 weight part of chlorinated polyethylene as an impact resistance modifier for 100 weight part of the basic resin.

8. The acrylonitrile-butadiene-styrene resin composition according to claim 1, wherein the resin composition additionally includes one or more additives selected from a group consisting of lubricants, heat stabilizers, anti-dripping agents, antioxidants, photo stabilizers, UV intercepting agents, pigments and inorganic fillers.

* * * * *